(12) United States Patent
Maggi et al.

(10) Patent No.: US 6,446,155 B1
(45) Date of Patent: Sep. 3, 2002

(54) RESOURCE BUS INTERFACE

(75) Inventors: Sergio Maggi, San Mateo; Mitchell Norcross, Fremont, both of CA (US)

(73) Assignee: Logitech Europe S. A., Romanel-sur-Morges (CH)

( * ) Notice: Subject to any disclaimer, the term of this patent is extended or adjusted under 35 U.S.C. 154(b) by 0 days.

(21) Appl. No.: 09/343,935

(22) Filed: Jun. 30, 1999

(51) Int. Cl.[7] .............................................. G06F 13/00
(52) U.S. Cl. ..................................... 710/313; 345/506
(58) Field of Search ............................... 710/100, 305, 710/306, 313; 345/501, 502, 503, 504, 505, 506

(56) References Cited

U.S. PATENT DOCUMENTS 6,188,381 B1 * 2/2001 van der Wal et al. ........ 345/554
6,329,996 B1 * 12/2001 Bowen et al. ............... 345/503

* cited by examiner

*Primary Examiner*—Glenn A. Auve
(74) *Attorney, Agent, or Firm*—Townsend and Townsend and Crew LLP

(57) ABSTRACT

New and improved methods and apparatus for transmitting data over a data bus. The invention provides a bus system including an external shared bus, an external bus interface, and a resource bus. The external bus interface can be configured to move data between the external shared bus and the resource bus. The bus system can also include a data processing pipeline coupled to the resource bus. The data processing pipeline can include a plurality of components for processing data. Some of the data processing components can be coupled to the resource bus.

25 Claims, 7 Drawing Sheets

```
rbAddress    ===XX==========N ============XXX== M1 ======X== M2 =============
rbRwL        ^^^^^_____ 0 = write _____/^^^^^^^^^^ 1 = read ^^^^^^^^^^
rbAS                                          /^\                   /^\
rbDS                                     /^^\    /^^\          /^^\   /^^\
fnctDataAck                             /^\      /^\          /^\     /^\
```

```
rbAddress     ===XX========= N ===========XXX== N+1 ===========XX=======
rbRwL         ---XX/^^^^^^^^^^^^ 1 = read ^^^^^^^^^^^^^^^^^^^^^^^^^^
rbAS              \____/
fnctSelected    __X/^^^^^^^^^^^^^^^^^^^^^^^^^^^^^^^^^^^^^\____
fnctBufOk       __X/^^^^^^^^^^^^^^^^^^^^^^^^^^\____
rbDS                              \___/            \___/
fnctData      XXXXXXXXXXXXXXXXXXXX== D1 ==XXXXXXXXXXXXXX= D2 ===XXXXXXXXXXXXXX
fnctDataAck                        \___/                \___/
```

750

RESOURCE BUS INTERFACE

CROSS-REFERENCES TO RELATED APPLICATIONS

This application relates to pending application Ser. No. 09/343,948, entitled "Header Encoding Method and Apparatus for Packet-Based Bus," and application Ser. No. 09/345,167, entitled "Image Sensor Based Vignetting Correction," both filed on the same day as the present application, which are incorporated herein by reference.

BACKGROUND OF THE INVENTION

The present invention relates to any bus architecture, such as the universal serial bus (USB), and in particular to communication among devices coupled directly and indirectly to such a bus.

Computers are becoming increasingly common place. As computers become more powerful, their capabilities also grow. In fact, computers are quickly replacing the functionality of other equipment such as telephones, televisions, cameras, and the like. Manipulation of image data is one of these new areas which has been met with considerable enthusiasm by consumers and corporations alike. The advent of relatively inexpensive cameras which can be connected to any computer is helping this move. Logitech, Inc., of Fremont Calif., the assignee of the present application, has been in the forefront of this technology and provides many solutions for computer users.

One easy way for connecting image capturing equipment to a computer is through a USB interface. Currently, USB provides plug and play support for more than 100 peripherals without significant user interaction. Further information regarding USB can be found in the USB specification, revision 1.1, released Sep. 23, 1998, which is hereby incorporated herein by reference.

One way to provide additional ports to USB is by using USB hubs. These hubs, however, merely provide additional physical connections to a computer with a USB interface. Therefore, USB hubs do not provide the intelligence or flexibility required for adding additional functionality to a USB interconnection.

As usage of image data becomes increasingly popular, the demand for more functionality and flexibility within electronic systems increases. The additional functionality and flexibility may include more image processing routines or connectivity with new and additional interfaces. Also, as different image processing standards and communication interfaces are introduced, the need for an implementation that can be easily adapted increases.

Accordingly, a technique is desirable wherein data processing devices can be operated in a variety of modes, to more quickly, efficiently, and easily adapt to many existing and future data processing standards and communication protocols.

SUMMARY OF THE INVENTION

The present invention provides new and improved methods and apparatus for transmitting data over a data bus. The invention, in one embodiment, provides a bus system including an external shared bus, an external bus interface, and a resource bus. The external bus interface can be configured to move data between the external shared bus and the resource bus. The bus system can also include a data processing pipeline coupled to the resource bus. The data processing pipeline can include a plurality of components for processing data. Some of the data processing components can be coupled to the resource bus.

In another embodiment, the bus system can include data collection modules. The data collection modules can be configured to collect information from devices coupled to the resource bus.

In yet another embodiment, the present invention provides a method for automatically adjusting a data processing pipeline to avoid introduction of artifacts into data being processed by the data processing pipeline. The method includes collecting information from a component within the data processing pipeline. The collected information is then processed to determine whether to make an adjustment to the data processing pipeline. If it is determined that an adjustment is to be made to the data processing pipeline, a triggering event is determined. The method then waits for the determined triggering event before making the adjustment.

In a further embodiment, the present invention provides a method for synchronizing operations in a bus system. The method receives data, loads the received data into a shadow storage, and determines whether to update an active storage with the loaded data from the shadow storage. If it is determined that the active storage is not to be updated with the loaded data from the shadow storage, the method waits for the next determining step. Once it is determined that the active storage is to be updated with the loaded data from the shadow storage, the method transfers the loaded data from the shadow storage into the active storage. In this fashion, the provided delay by the waiting step avoids introduction of artifacts into data being processed.

One advantage of the present invention is that it allows for a data processing pipeline to be quickly, efficiently, and easily adapted to a variety of modes. For example, the external bus interface can be modified to accommodate for changes in the modules connected to the resource bus, such as those within the data processing pipeline. Similarly, for a different type of the external shared bus, modification can be made to the external bus interface alone.

Another advantage of the present invention includes providing automatic adjustments to selected components of a data processing pipeline and, thereby, avoiding introduction of artifacts into data being processed by the data processing pipeline. These adjustments can be based on data collected from selected components of the data processing pipeline. Also, the adjustments can be made at the data capturing end before any data is manipulated. This will allow for more accurate corrections, for example, if the data is compressed using a lossy compression. Additionally, making the adjustments at the data capturing end can reduce the required bandwidth for transferring the data to a host for processing.

For a further understanding of the nature and advantages of the invention, reference should be made to the following description taken in conjunction with the accompanying drawings.

BRIEF DESCRIPTION OF THE DRAWINGS

FIGS. 7A and 7B illustrate exemplary timing diagrams 700 and 750 in accordance with embodiments of the present invention.

DESCRIPTION OF THE SPECIFIC EMBODIMENTS

Figure 1:
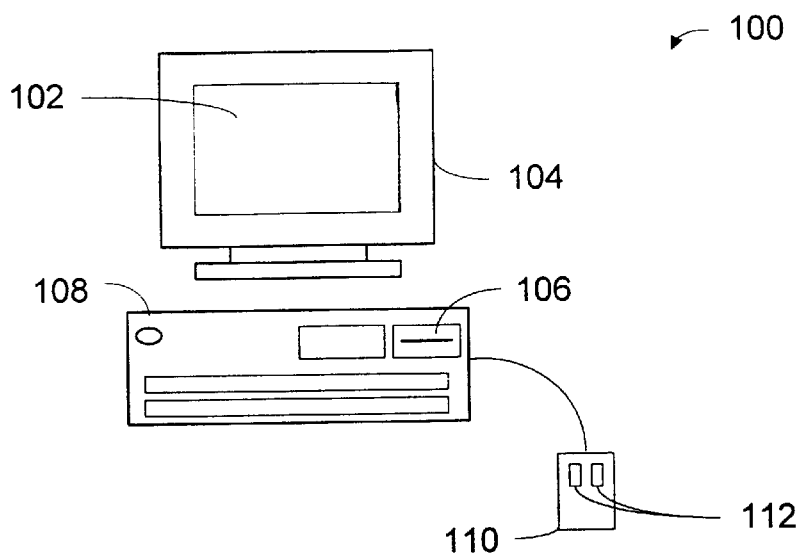
FIG. 1 illustrates an example of a computer system used to execute methods of embodiments of the present invention.

FIG. 1 illustrates an example of a computer system used to execute the software of the present invention. FIG. 1 shows a computer system 100 which includes a monitor 104, screen 102, cabinet 108, keyboard 214 (see FIG. 2), and mouse 110. The mouse 110 can have one or more buttons such as mouse buttons 112. The cabinet 108 can house a CD-ROM drive 106 and a hard drive (not shown) which can be utilized to store and retrieve software programs incorporating the present invention. Although the CD-ROM 106 is shown as removable media, other removable tangible media including floppy disks, tape drives, ZIP® drives, and flash memory can be utilized. The cabinet 108 can also house familiar computer components (not shown) such as a processor, memory, and the like.

Figure 2:
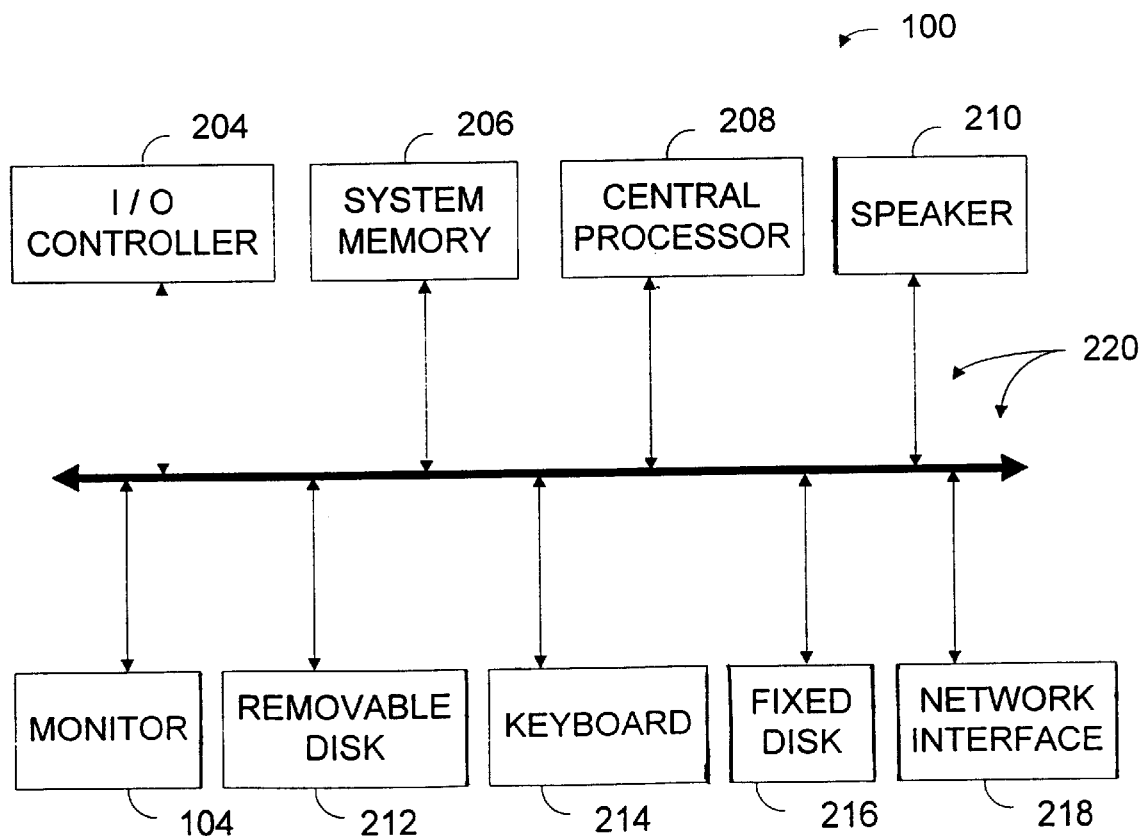
FIG. 2 illustrates a simplified system block diagram of a typical computer system 100 used to execute the methods of embodiments of the present invention.

FIG. 2 illustrates a simplified system block diagram of a typical computer system 100 used to execute the software of embodiments of the present invention. As shown in FIG. 1, the computer system 100 can include the monitor 104. The computer system 100 can further include subsystems such as I/O controller 204, system memory 206, central processor 208, speaker 210, removable disk 212, keyboard 214, fixed disk 216, and network interface 218. Other computer systems suitable for use with the present invention may include additional or fewer subsystems. For example, another computer system could include more than one processor 208 (i.e., a multi-processor system) or a cache memory. Arrows such as 220 represent system bus architecture of the computer system 100. However, these arrows 220 are illustrative of any interconnection scheme serving to link the subsystems.

For example, a local bus could be utilized to connect the central processor 208 to the system memory 206. Also, an image capture device such as a charge-coupled device (CCD) camera can be connected to the computer system 100 for capturing image data. The image capture device can be connected to the computer system 100 via the same or another bus architecture such as a USB, enhanced parallel port (EPP), extended capabilities port (ECP), IEEE 1394 (Firewire), and the like. USB can provide plug and lay support for more than 100 connected peripherals by using an identification number which is matched against a database of device drivers. In some implementations, USB provides a 12 Mb/sec bandwidth.

The USB can also be connected to the computer system 100 through the I/O controller 204 or the network interface 218. Additionally, the computer system 100 can be configured to communicate with the Internet via, for example, the I/O controller 204 or the network interface 218. Accordingly, data can be transmitted to and from the computer system 100 by a variety of devices such as those on the Internet. The computer system 100 shown in FIG. 2 is but an example of a computer system suitable for use with the present invention. Other configurations of subsystems suitable for use with the present invention will be readily apparent to those of ordinary skill in the art.

Figure 3:
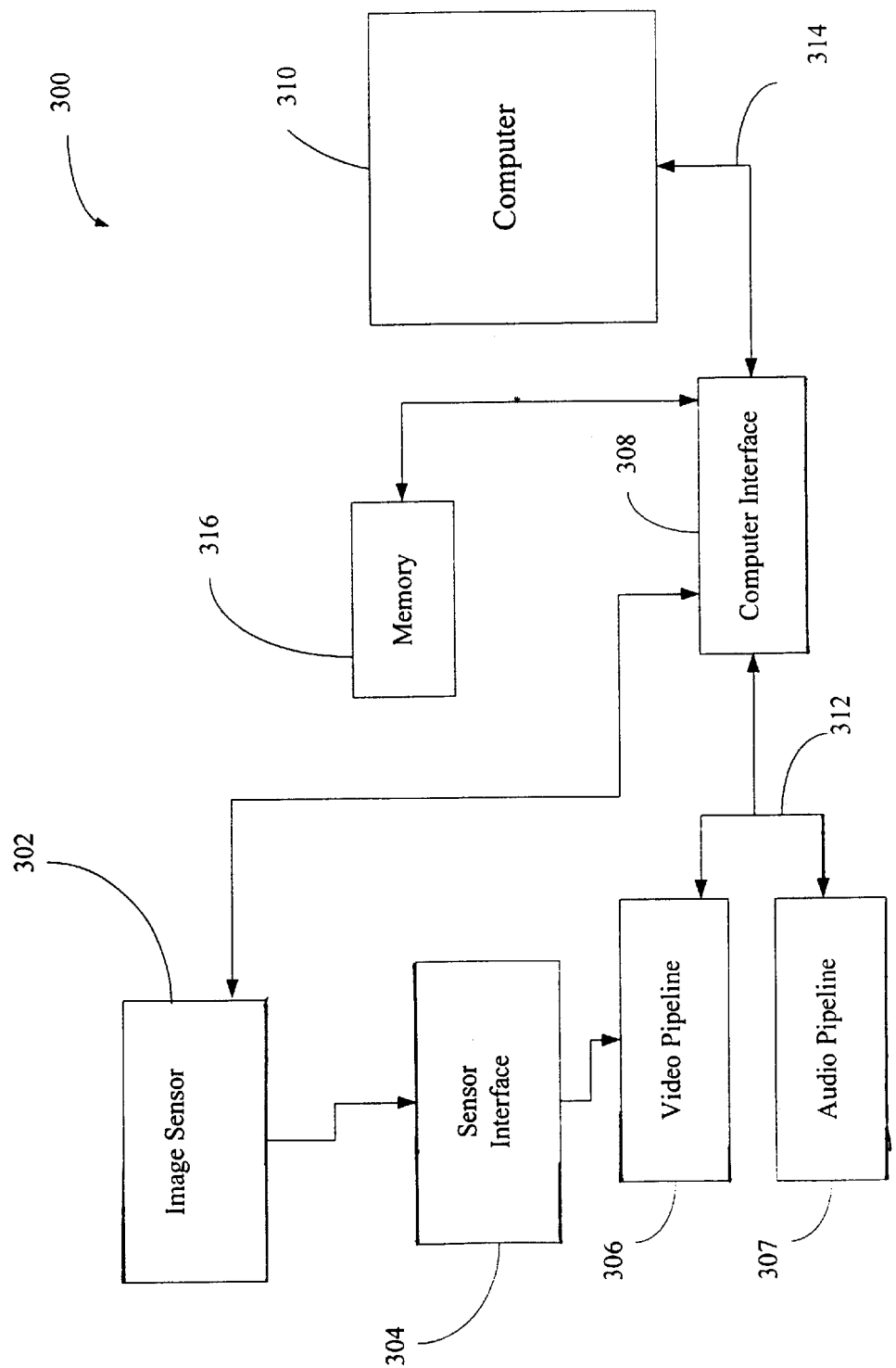
FIG. 3 illustrates a simplified block diagram of a system 300 in accordance with an embodiment of the present invention.

FIG. 3 illustrates a simplified block diagram of a system 300 in accordance with an embodiment of the present invention. An image sensor 302 captures image data. The image sensor 302 can be selected from any number of devices for capturing images including a CCD, complementary metal oxide semiconductor (CMOS), and the like. In some embodiments, the image sensor 302 can include circuitry for conversion of analog data to digital data. The image sensor 302 can also be an application specific integrated circuit (ASIC). The captured image data from the image sensor 302 is provided to a sensor interface 304. The sensor interface 304 can be configured to convert serially transmitted data from the image sensor 302 into packets of data. For example, the sensor interface 304 can format data from different types of sensors into a format used by a video pipeline block 306. The format of the data include information which can be commonly used by components within the video pipeline block 306. The common information can include video frame start, video frame end, active video row, active pixel, and the like. The frame of data can be any size, but is preferably 352×288 pixels. The frame can also be a block of 320×240, 176×144, or 160×120 pixels. In some embodiments, the frame of data can be a block of 640×480 pixels.

The video pipeline block 306 can process the image data in accordance with selected criteria. For example, the image data can be compressed, encoded, color corrected, gamma corrected, and the like. The decompression can be done in accordance with Huffman, differential parse code modulation (DPCM), other types of entropy coding, and the like.

The system 300 can also include an audio pipeline block 307. The audio pipeline block 307 can receive audio information from audio sensors (not shown) such as a microphone sensor and the like. The audio pipeline block 307 can process the audio data in accordance with selected criteria. For example, the audio data can be compressed, encoded, converted, and the like. The audio pipeline can include components for volume adjustment, audio sampling, and the like. The audio pipeline can also have a buffer manager with storage. The audio pipeline can process the audio data in accordance with any known audio data formatting standard, such as the motion-picture-experts group, audio level 7 (MP3).

The processed image and audio data can then be provided to a computer interface 308. The computer interface 308 provides an interface for communication between the video pipeline block 306, the audio pipeline block 307, and a computer 310. The computer 310 can be a system such as the system 100 of FIGS. 1 and 2. For example, the computer interface 308 can provide the image data from the video pipeline block 306 to the computer 310. Similarly, the computer interface 308 can provide an interface for communicating commands, instructions, settings, and other types of data from the computer 310 to the video pipeline block 306.

A resource bus 312 couples the computer interface 308 with the video pipeline block 306 and the audio pipeline block 307. The resource bus 312 can be selected from a variety of options known to those with ordinary skill in the art, and is preferably bi-directional and has a shared bus configuration. For example, the resource bus 312 can be a single master, multiple slave bus interface. The slaves can be the components or functions performed within the video pipeline block 306. In some embodiments, the master can interface with a host such as the computer 310.

As shown in FIG. 3, the computer interface 308 can directly communicate with the image sensor 302. The communication can, for example, include changes to the settings of the image sensor 302. Alternatively, the computer interface 308 can communicate with the image sensor 302 through the resource bus 312.

An external shared bus 314 couples the computer 310 and the computer interface 308. The external shared bus 314 can be bi-directional and selected from many types of connectors or bus architectures which are well known to those with ordinary skill in the art. For example, the external shared bus 314 can be a USB connection. A USB connection is preferred for some embodiments because it is a powered bus which currently provides up to 500 mA and 5 V. The power provided by USB can be utilized to run the devices connected to the bus, such as the image sensor 302, the sensor interface 304, the video pipeline block 306 (and/or its components), and the computer interface 308. Additionally, USB can be less costly to implement. In some embodiments, USB may not be able provide the same bandwidth as other faster bus architectures such as Firewire. Therefore, USB can be utilized where the data is first compressed, for example within the video pipeline block 306, prior to transmission on the USB.

Also, the computer 310 can be any output device including a printer, display, a handheld device such as a Palm Computing® device, any electronic or optical output device, and the like. The system 300 also includes a memory 316 which can provide storage for the computer interface 308. The memory 316 is preferably a non-volatile storage device such as a hard disk or removable media. The memory 316 can, however, be any type of storage such as dynamic random access memory (DRAM), extended output DRAM (EDO DRAM), synchronous DRAM (SDRAM), video RAM (VRAM), static RAM (SRAM), read-only memory (ROM), erasable programmable ROM (EPROM), electrically erasable programmable ROM (EEPROM), flash memory, and the like. The memory 316 can also provide storage to other components of system 300 such as the video pipeline block 306 and the audio pipeline block 307. Alternatively, the components of the system 300 can have their own local memory and utilize the memory 316 for their storage when needed. The components of the system 300 can also include buffers for storage of the data being processed by each component. Moreover, the individual components of the system 300 can include memory for storage of settings and other configuration related information.

Figure 4:
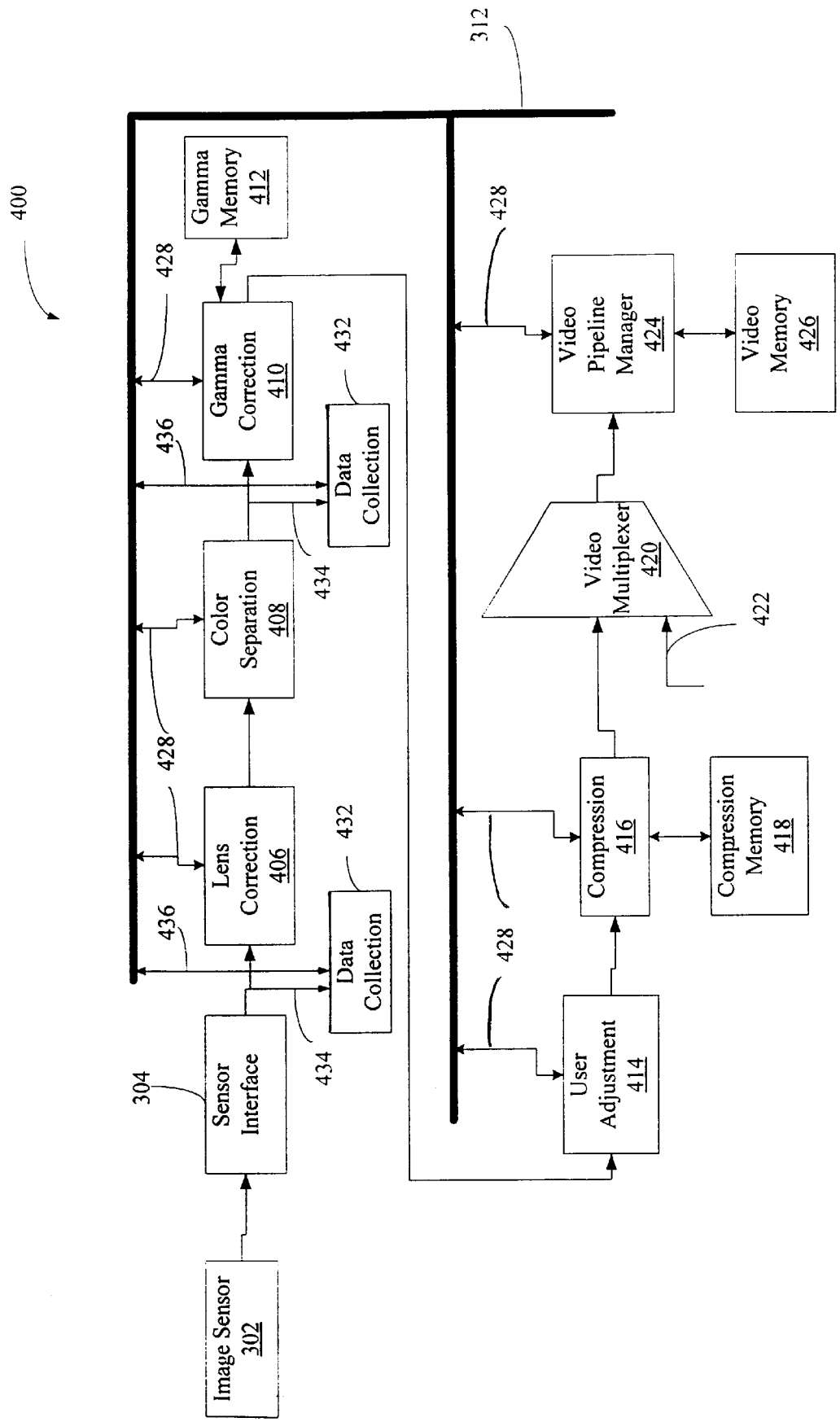
FIG. 4 illustrates a simplified block diagram of a video pipeline 400, illustrating further details of the video pipeline block 306 of FIG. 3, in accordance with an embodiment of the present invention.

FIG. 4 illustrates a simplified block diagram of a video pipeline 400. The video pipeline 400 illustrates further details of the video pipeline block 306 of FIG. 3 in accordance with an embodiment of the present invention. Elements appearing in FIG. 4 which were introduced in previous figures are referred to with the same reference numerals which were originally used. The image sensor 302 captures image data and provides the captured image data to the sensor interface 304. The sensor interface 304 can provide an interface to available image sensors on the market. The sensor interface 304 can process the captured image data from the image sensor 302 into an appropriate format for utilization within the video pipeline 400 or by other devices. For example, the raw captured data from the image sensor 302 can be in an 8-bit word format, a 10-bit format, a 4+4-bit format, and the like.

In some embodiments, the sensor interface 304 formats the captured raw data into a 10-bit format and passes it to a lens correction block 406. The sensor interface 304 can also provide a strobe signal to the lens correction block 406 to indicate the presence of new data for processing by the lens correction block 406. This strobe signal can, for example, indicate the start of a new frame of image data. The lens correction block 406 can perform data correction processing on the captured raw data. For example, for correction of vignetting problems, the pixels away from the center of the image can be corrected, whereas pixels around the center of the image may receive no correction. This feature is especially useful where cheaper lenses or lenses with different light profiles are utilized to capture an image. Further information regarding the correction of vignetting problems can be found in the related co-owned application Ser. No. 09/345,167, entitled "Image Sensor Based Vignetting Correction," filed on the same day as the present application, which is incorporated herein by reference.

At this point, each pixel of the raw data can include information regarding a single color, such as red, green, or blue. Accordingly, the video pipeline 400 can also include another block (not shown) to calculate the missing colors for each pixel. For example, if one pixel only includes information in red, green and blue information can be calculated for that pixel also.

After processing the data by the lens correction block 406, the data can be passed to a color separation block 408. The color separation block 408 can calculate colors in accordance with a given standard. For example, the color separation block 408 can extract red-green-blue (RGB) data and the like. The color separated data can then be passed to a gamma correction block 410 which is configured to correct for gamma. The gamma correction block 410 can have access to a gamma memory 412 which can be selected from a number of storage devices such as set forth with respect to the memory 316 above. At this stage, the gamma corrected data can be converted to a YUV format, where Y is the luminance, U is the chrominance red, and V is the chrominance blue. The data can also be clipped to conform with a given standard, such as common interchange format (CIF), quarter CIF (QCIF), and the like. This can be done, for example, when the YUV data is out of range.

The data is then provided to a user adjustment block 414 which can provide adjustments to the data being processed. These adjustments can include gain, offset, color adjustment, and the like. The values for the gain and offset can be provided by an outside source, such as a computer user, a driver software, an internet command, and the like. The user adjusted data can then be provided to a compression block 416. The compression block 416 can be configured to compress the data from the user adjustment block 414 using lossy or lossless techniques known to those with ordinary skill in the art. For example, the compression block 416 can perform discrete cosine transform, wavelet transform, vector quantization, Huffman coding, variable length coding (VLC), other types of entropy coding, arithmetic coding, and the like.

The compression block 416 can also have access to a compression memory 418 for storage purposes. The compression memory 418 can be any type of storage such as discussed with respect to the memory 316 above. The compressed data can then be provided to a video multiplexer 420. The video multiplexer 420 can also receive data on an input node 422. The input node 422 can provide data from, for example, the sensor interface 304, other raw or partially processed data, and the like. The selected input data from the video multiplexer 420 can then be provided to a video pipeline manager 424. The video pipeline manager 424 can have access to a video memory 426 which can be any type of storage, including those discussed with respect to the memory 316.

All or selected components of the video pipeline 400 can be coupled via connectors 428 to the resource bus 312. The connectors 428 can be any suitable connector. In some embodiments, different types of connectors 428 can be utilized for different components being coupled to the resource bus 312. Alternatively, the connectors 428 can be a part of the resource bus 312 itself. The resource bus 312 can be selected from a variety of options known to those with ordinary skill in the art, such as a single master, multiple slave bus. Since the rate of data flow on the resource bus 312 can differ from that of the pipeline starting, for example, with the image sensor 302 through to the video multiplexer 420, the video pipeline manager 424 can temporarily store the captured and processed data before providing it to the resource bus 312.

For example, in embodiments where the resource bus 312 is running at speeds comparable to the USB standard, the video memory 426 can have a size of about 2 k byte. Such a configuration will provide a 2 millisecond delay required by the current USB standard. Clearly, the size of the video memory 426 will depend on the given implementation. The video pipeline manager 424 can also provide a selection signal (not shown) to the video multiplexer 420 to indicate which one of the inputs to the video multiplexer 420 should be selected.

The video pipeline 400 can also include other types of modules such as data collection modules 432. The data collection modules can have different designs depending on the given implementation. Accordingly, different types of data collection modules can be utilized within the video pipeline 400. In some embodiments, these additional modules can be configured to work in parallel with the other components. This can assure that the additional modules do not add to any delays associated with data processing by the video pipeline 400. These data collection modules can collect certain statistics for every frame of data captured by the image sensor 302 via connectors 434. The connectors 434 can be any suitable connector. In some embodiments, different types of connectors 434 can be utilized for the data collection modules being coupled to different components. Alternatively, the data collection modules 432 can collect data at other intervals. These modules can be utilized at various locations within the video pipeline 400.

Accordingly, location and number of the data collection modules is not limited to those illustrated in FIG. 4. For example, analog signal statistics can be collected to ensure that the video pipeline 400 does not saturate the analog signals. Other types of statistics collected can be white balance statistics to run the white balance algorithm to ensure the captured image does not appear too bright. Another data collection module can collect statistics information regarding automatic gain control to ensure that data is kept within a given range for a standard.

The collected data can then be provided to the video pipeline manager 424 through, for example, the input node 422 of the video multiplexer 420. Alternatively, data collection modules 432 can provide the collected data to any device coupled to the resource bus 312, including the video pipeline manager 424, via connectors 436. The connectors 436 can be any suitable connector. In some embodiments, different types of connectors 436 can be utilized for different modules being coupled to the resource bus 312. In some embodiments, the connectors 436 can be the same as the connectors 428. Accordingly, the video pipeline manager 424 can provide different types of data on the resource bus 312, including video data, statistical data, start and end of data frames, and the like. The collected data can then be utilized to adjust settings within the video pipeline 400. The adjustment can, for example, include those discussed with respect to the user adjustment block 414.

Also, the adjustments can be made at the data capturing end before any data is manipulated. For example, data can be collected before user controls are applied, and before data is compressed and decompressed at a host. This can assure that more accurate data is used for corrections, for example, if the data is to be compressed with a lossy compression. Additionally, making the adjustments at the data capturing end can reduce the required bandwidth for transferring the data to a host for processing.

Figure 5:
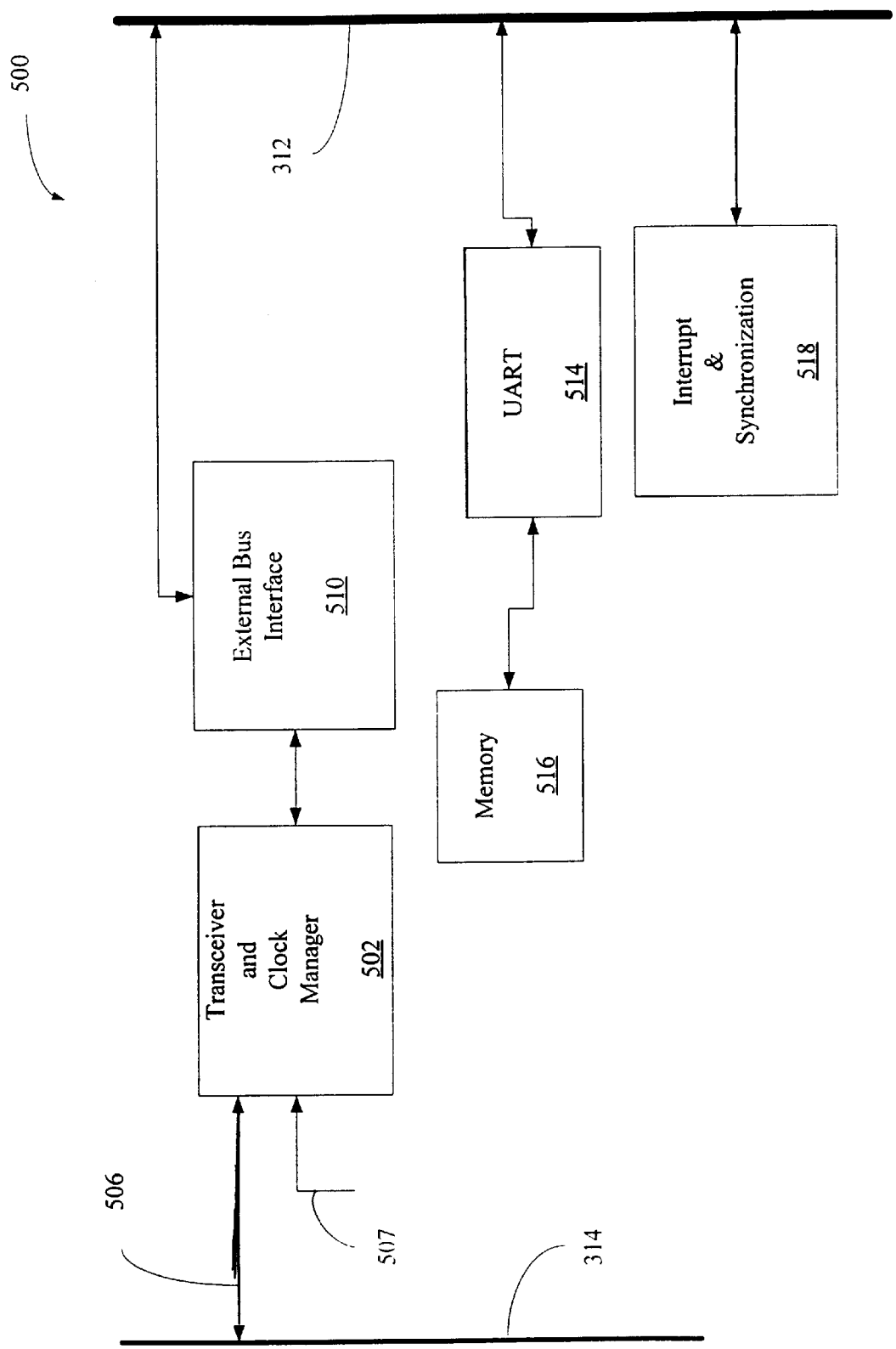
FIG. 5 illustrates a simplified block diagram of a computer interface system 500, illustrating further details of the computer interface 308 of FIG. 3, in accordance with an embodiment of the present invention.

FIG. 5 illustrates a simplified block diagram of a computer interface system 500 in accordance with an embodiment of the present invention. The interface system 500 illustrates further details of the computer interface 308 of FIG. 3 in accordance with an embodiment of the present invention. Elements appearing in FIG. 5 which were introduced in previous figures are referred to with the same reference numerals which were originally used. A transceiver and clock manager 502 is connected to the external shared bus 314 via a connector 506. The external shared bus 314 can be selected from a a variety of bus architectures such as EPP, ECP, Firewire, and the like, but is preferably a USB interface. The transceiver and clock manager 502 is coupled to an external bus interface 510. The transceiver and clock manager 502 is configured to pass data between the external shared bus 314 and the external bus interface 510. The transceiver and clock manager 502 can also be responsible for extracting a clock signal from the data. Alternatively, the transceiver and clock manager 502 can provide different clock signals for different components of the computer interface system 500. The transceiver and clock manager 502 can also receive its own clock from an external source on an input node 507. For the current USB standard, the clock is preferably at 48 MHz or is alternatively at 12 MHz which is multiplied by four. The clock multiplication can be performed by a phase-locked loop (PLO), which in some embodiments can be inside the transceiver and clock manager 502.

The external bus interface 510 can check the received data in accordance with the standards defined for the external shared bus 314. For example, the external bus interface 510 can decode commands which are received from the external shared bus 314. As indicated in FIG. 5, the connections to and from the blocks 502, and 510 can be bidirectional. The external bus interface 510 can be connected to the resource bus 312. The external bus interface 510 can act as the master of the resource bus 312. Accordingly, the external bus interface 510 can provide a communication means for transferring data between the external shared bus 314 and the resource bus 312.

The external bus interface 510 can act as a master for slaves coupled to the resource bus 312. The bus can be implemented in different technologies including a tri-state buffer configuration, wherein all the functions can share a single function bus. If a tri-state buffer configuration is not utilized, each function can communicate with the master via its own bus. The master-slaves communication can be implemented with bus transfers which are initiated by the master. A bus transfer can include one or more bus cycles. In a bus cycle, the master can point to a resource (or function) such as a register, memory, cache, or other slaves. The purpose of a cycle may not be limited to data transfers. For example, a write to an address can depend on the type of resource residing at that address. Accordingly, a write to a specific address can be a reset command. Further details of exemplary embodiments of the bus architecture can be found below under the headings "Bus Physical Layer" and "Bus Logical Layer."

Various encoding techniques can be utilized with the resource bus 312. In some embodiments, encoded headers can be utilized for the packets sent on the resource bus 312. Separate headers can be utilized for audio and video information. Also, virtual pipes can be configured to transfer data more efficiently, quickly, and accurately over any packet-based bus. Further examples regarding header encoding can be found in the related co-owned application Ser. No. 09/343,948, entitled "Header Encoding Method and Apparatus for Packet-Based Bus," which was filed on the same day as the present application and is incorporated herein by reference.

The computer interface system 500 can also include a storage device (not shown) which can store settings and configuration information for use by the external shared bus 314 from the devices that are coupled to the external shared bus 314 via the connector 506. For example, for the USB implementation, the storage device can include the USB descriptors. This storage can be any type of storage such as discussed with respect to the memory 316, but is preferably a read-only memory (ROM) device. The storage device can also include information regarding the details of the USB communication utilized for a given embodiment. Alternatively, the ROM could be coupled to a non-volatile storage to provide an efficient and easy way to change some of the information that is stored in the ROM.

The resource bus 312 can also be connected to other components such as data processing pipelines or selected components within those pipelines. For example, the pipelines can include an audio pipeline such as the audio pipeline block 307 of FIG. 3. The managers for each of these pipelines can sit on the resource bus 312. Alternatively, these pipeline managers can be implemented in one block so they can share resources.

A universal asynchronous receiver-transmitter (UART) 514 is coupled to the resource bus 312 and is configured to provide a low cost communication means for other devices such as those on the resource bus 312, or elsewhere. Parallel buses can also be utilized to provide such a communication channel, but parallel buses are generally more expensive to implement. The UART 514 can have a memory 516, which is preferably a non-volatile storage. The memory 516 can also be any type of storage, such as discussed with respect to the memory 316. In some embodiments, the non-volatile storage can be the memory 316 of FIG. 3.

The memory 516 can contain information about settings and configurations of devices coupled to the computer interface system 500. The memory 516 can also contain registers associated with individual devices on the computer interface system 500. Other devices on the resource bus 312, such as the external bus interface 510, can load both an address of a device and the data to be transmitted for the UART 514. The UART can then go through its registers and send the address and data to other devices, such as the image sensor 302.

An interrupt and synchronization block 518 is coupled to the resource bus 312. The interrupt and synchronization block 518 can provide support for interrupts from sources such as the external shared bus 502. In some implementation, the interrupts can be from a USB interface. Since the transceiver and clock manager 502 is not directly connected to the resource bus 312, the interrupt and synchronization block 518 can provide information about clock delays, power-up delays, and other power related issues. Such information can be dependent on the sensors and devices which are utilized. Also, information sent to the external shared bus 314 can be first collected in the interrupt and synchronization block 518. In embodiments with an audio pipeline, the audio pipeline can also communicate with other devices such as the computer system 100 through the resource bus 312.

Figure 6:
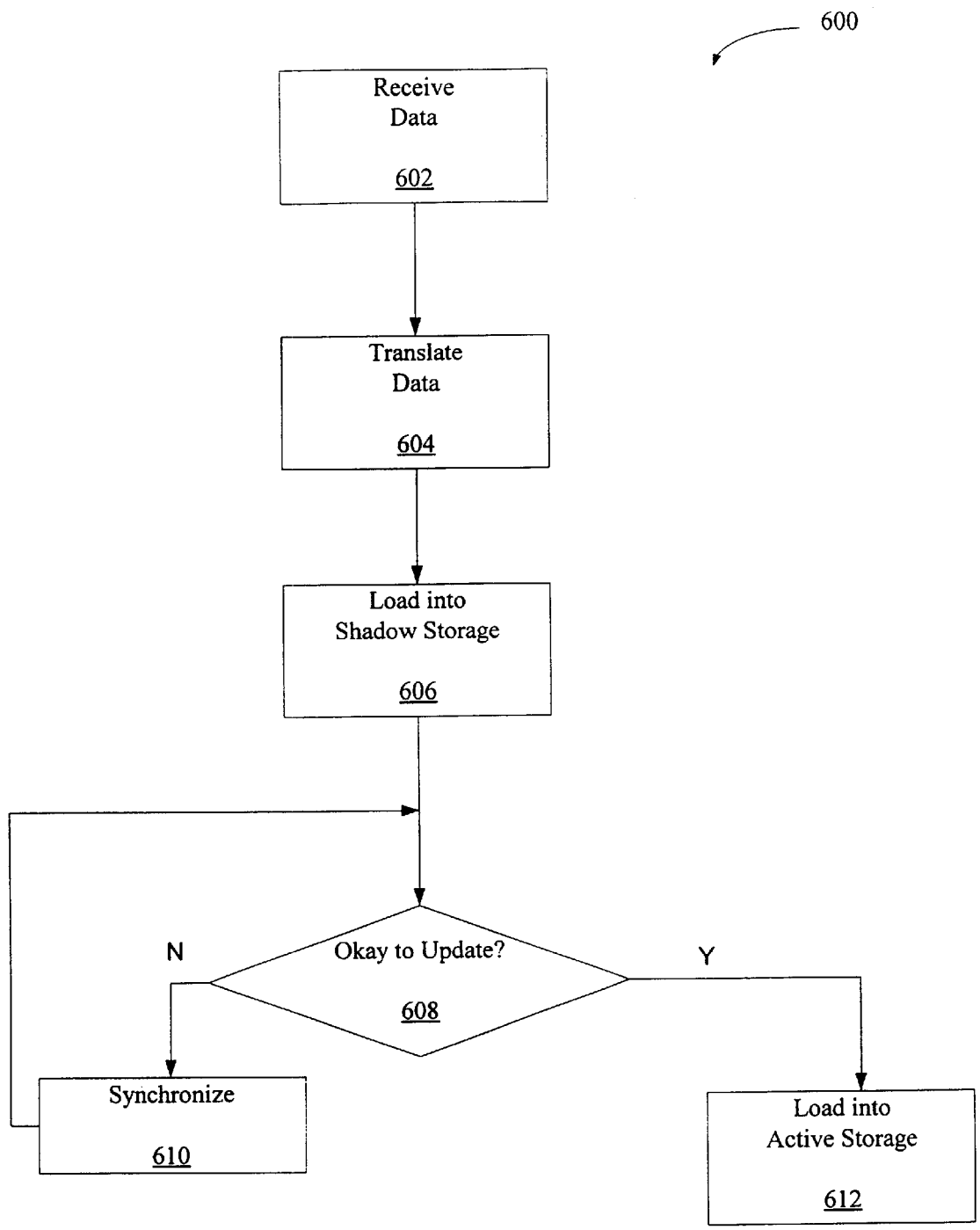
FIG. 6 illustrates an exemplary synchronization method 600 in accordance with an embodiment of the present invention.

FIG. 6 illustrates an exemplary synchronization method 600 in accordance with an embodiment of the present invention. Since the present invention can be applied to non-static devices, the synchronization method 600 can ensure that changes in ambient or other settings and configurations do not negatively effect the operation of a given system. For example, in implementations dealing with video data, a change in ambiance, such as luminance, can negatively effect data being processed by a video pipeline. A higher luminance can result in the captured video data going out of range and thereby losing information via saturation. Accordingly, an algorithm can be running constantly or periodically. This algorithm can assist in adjustments in response to the change in ambient parameters. Such an algorithm can be running as software or, alternatively, be implemented in hardware.

In other embodiments, collected statistical information at various locations of the video pipeline can be utilized to adjust the parameters of the video pipeline. As discussed with respect to FIG. 4, statistical data can be collected after data is output by the sensor interface 304, after data is output by color separation block 408, and at other locations of the pipeline. The changes of interest can include parameters, such as gains, exposures, color matrix calculation, and other variables distributed throughout the video pipeline and in some cases outside of the pipeline. The outside parameters can be those of the sensors utilized. Other inside variables can be, for example, within the color separation block 408.

Thus, when changes are made to the system, applying the required adjustments uniformly to the whole system may pose problems, because it may take a certain amount of time for the data to propagate through a given data processing pipeline. The amount of time can depend on many factors such as the sensors utilized to capture an image. For example, when a change needs to be made to the settings for the image sensor 302, it may take a number of video frames for the change to propagate through the whole video pipeline 400.

The present invention provides a solution to this problem. In an embodiment, the synchronization method 600 synchronizes the changes made to an item within a given data processing pipeline as new data presents itself into the pipeline. In a step 602, data is received. The data can be any type of data such as settings, commands, configuration information, and the like for elements within any data processing pipeline, such as the video pipeline 400 of FIG. 4. In the example of FIG. 4, the data can be settings for an image sensor, such as the image sensor 302. In an embodiment, the data can be received by the external bus interface 510. The data can originate from within the computer interface system 500 or from outside via, for example, the external shared bus 314. These commands can ultimately originate from a source such as a computer user, stored settings on a computer, determinations by a computer application, a source on the internet, and the like.

In a step 604, the received data can be translated. Generally, the received data requires translation because of the different message contents utilized within a system. The translation can, for example, include checking the received data for conformance with a given standard. The translation can also include decoding and parsing of the received data. For example, the external bus interface 510 can translate the received data for the UART 514 of FIG. 5. In a step 606, the translated data can be loaded into shadow storage. The shadow storage can be any type of storage such as discussed with respect to the memory 316 of FIG. 3. For example, the translated data can be loaded into the memory 516 of the UART 514. The shadow storage can provide storage for the translated data while changes to the pipeline are in progress and the new data is not to be loaded into the active storage.

In a step 608, it is determined when the translated data is to be updated. For example, the step 608 can determine when the UART 514 should send the stored data to the image sensor 302. In an embodiment, the step 608 can be implemented by having a video frame start signal. Then, the UART 514 can wait for the video frame start signal before sending information to the image sensor 302. If it is determined that the translated data is not to be updated, then a synchronization step 610 waits for the proper triggering event. The triggering event can have any value, but is preferably about one, about two, or about three frames for most type of sensors available on the market. The synchronization step 610 can be repeated until it is determined that proper triggering event for a given component has been reached. The proper triggering event can be determined by internal or external sources. The external sources can include user instructions, stored settings on a computer, determinations by a computer application, a source on the internet, and the like. The internal sources can include those discussed above with respect to the data collection modules, for example, to provide automatic adjustments. Once the step 608 determines that the translated data is to be updated, in a step 612, the information is provided to a selected component of the pipeline by loading the information into an active storage. The active storage can be any type of storage such as discussed with respect to the memory 316 of FIG. 3. The active storage can also be the storage within or accessible to the selected component of the pipeline.

Therefore, automatic adjustments can be made to the pipeline at specific locations and at proper times to ensure that no artifacts present themselves into the data being processed. For example, if the gain at the image sensor 302 is reduced, the synchronization method 600 can increase the gain in the video pipeline 400 at an appropriate time. Accordingly, the synchronization method 600 can be applied to all types of settings and configurations associated with any data collection and processing pipeline. Also, as discussed with respect to the interrupt and synchronization block 518, interrupts can be dealt with in the same way as synchronization discussed with respect to FIG. 6. Moreover, additional blocks can also be provided for synchronizing audio and video data so that when both types of data are received by any device, the audio and video data will be synchronized.

Bus Physical Layer

Some exemplary embodiments for the physical layer of a bus which can be utilized to practice the embodiments of the present invention such as those discussed with respect to the resource bus 312 are discussed in further details below.

Bus Lines

In some implementations, the bus can include unidirectional lines, so no bus line is used by both the master and slaves. The slaves can also be referred to as functions. Some lines can be controlled by the master which are indicated as "rb" lines and some lines can be controlled by the slaves. If the master can determine what specific function is selected. The master can do this from the address.

The bus physical description can include a line called rbClock. In a single clock, synchronous implementation, all bus entities can use the rising edge (or falling edge) of the rbClock to evaluate the bus lines. This bus can also be implemented with asynchronous (where bus entities act on edges of bus line signals) or multi-clock (where entities have internal clocks which have different frequencies) embodiments. Accordingly, it is possible to implement this bus with master and functions running under different clocks or in a clock-less, fully asynchronous embodiments. Moreover, these alternatives can be mixed.

Table 1 illustrates an exemplary list of bus lines that can be controlled by the master.

TABLE 1

Bus Lines Controlled by Master

| Line | Size | Purpose |
| --- | --- | --- |
| rbAddress | any (16) | Points to the resource being addressed. Can be changed at the beginning of a bus transfer; in some implementations, 2 cycles (minimum) before rbAS. Can be changed at the beginning of a bus cycle; in some implementations, 2 cycles (minimum) before rbDS. |
| rbRwL | 1 | Direction of transfer: 1 = Read (functions to master), 0 = write. Can be changed at the beginning of a bus transfer; in some implementations, 2 cycles (minimum) before rbAS. Set by the Master at the same time as the address. |
| rbAS | 1 | Address Strobe. Start of bus transfer. Can last one cycle of the clock of the master. Can be used by the functions that want or need to latch the address. |
| rbData | any (8,16) | Data from master to all functions. Can be changed at the beginning of a bus cycle; in some implementations, 2 cycles (minimum) before rbDS. |
| rbDS | 1 | Data strobe. Start of bus cycle (can be preceded by an address change). Asserted until function responds or cycle time-out. It is a request to the functions to respond to the Master. |

Table 2 illustrates an exemplary list of bus lines that can be controlled by the functions.

TABLE 2

Bus Lines Controlled by Functions

| Line | Size | Purpose |
| --- | --- | --- |
| fnctSelected | 1 | Asynchronous response to rbAddress. Acknowledgment that an existing resource is being addressed by the bus master. A resource can be configured to be activated by more than one address. Such a resource can be referred to as a multi-address resource. |
| fnctBufOk | 1 | Not present in every function. Default settings are absent or high. |

TABLE 2-continued

Bus Lines Controlled by Functions

| Line | Size | Purpose |
|---|---|---|
| fnctDataAck | 1 | Lowered if the resources has no data available (i.e. an empty FIFO). Set to 1 as the function response to rbDS = 1. Meaning: for a write cycle it has completed the cycle (i.e. latched the rbData); for a read cycle it has placed the requested data onto its data bus. Brought back to 0 after master has removed rbDS. |
| fnctData | any (8,16) | Data returned by the function. Driven during fnctDS. |

As stated previously, other bus lines can include rbClock with a size of 1. This bus line can define the term "clock cycle" used in this description. Namely, one bus cycle would be equal to one rbClock period.

Bus Transfers and Bus Cycles

FIG. 7A illustrates an exemplary timing diagram 700 for a 2-cycle write transfer followed by a 3-cycle read transfer. The properties of signals represented in the timing diagram 700 are defined in Tables 1 and 2 above. For rbAddress, X indicates invalid (or don't care) address values, N indicates the write transfer address, and M1–M2 indicate the read transfer addresses. The master can change the address every cycle. A transfer can be a unidirectional series of bus cycles. As indicated, the rbAS strobe can signal the start of a transfer. The rise of rbDS initiates a bus cycle.

The sequence of events for a write transfer can be as follows:

1a. Master places the resource address on the bus;

1b. Master sets the rbRwL low, signaling a write transfer;

2. Master strobes the rbAS line for 1 or more clock cycles;

3. Master can place data on the rbData bus (a command to a resource may not require data); and 4. Master sets rbDS, requesting the function's reply and waits for fnctDataAck.

The remaining sequence of events for a successful completion of the write transfer cycle can be as follows:

5. Function consumes data and sets fnctDataAck;

6. Master detects fnctDataAck and lowers rbDS (which frees it to change address and data for next bus cycle); and 7. Function lowers fnctDataAck.

After step 7, the write cycle is complete and the bus can return to step 3 for a new bus cycle.

For an unsuccessful write cycle, however, at step 5, master can wait for a time-out period and then reset rbDS. The time-out period for the write cycle is preferably about four clock cycles, but could be any other value depending on the implementation. Master can abort the rest of transfer.

The sequence of events for a read transfer can be as follows:

1–2. Similar to the write transfer steps 1–2 above; and

3. Master sets rbDS, requesting the function's reply and waits for fnctDataAck.

The remaining sequence of events for a successful completion of the read transfer cycle can be as follows:

4. Function places requested data on fnctData and sets fnctDataAck;

5. Master lowers rbDS, indicating that the master has acquired the data; and

6. Function lowers fnctDataAck.

After step 6, the read cycle is complete and the bus can return to step 3 for a new bus cycle.

For an unsuccessful read cycle at step 3, the master can wait for a time-out period, preferably four clock cycles. Those with ordinary skill in the art would, however, understand that the predefined time-out for the bus cycle will depend on the implementation. If no fnctDataAck is detected after waiting for the read time-out period, master can lower rbDS. Master can abort the rest of transfer.

FIG. 7B illustrates another exemplary timing diagram 750 for a 2-cycle read transfer. The properties of signals represented in the timing diagram 750 are defined in Tables 1 and 2. Again, X indicates invalid (or don't care) address values, N and N+1 indicate valid address data from master, and D1–D2 indicate valid address data from functions. The master can change the address at every bus cycle. As indicated, the rbAS strobe can signal the start of a transfer. The rise of rbDS can initiate a bus cycle followed by the rise of fnctDataAck.

Bus Logical Layer

Some exemplary embodiments for the logical layer of a bus which can be utilized to practice the embodiments of the present invention such as those discussed with respect to the resource bus 312 are discussed in further details below.

Types of Bus Slaves

Many different types of slaves can be selected for the embodiments of the present invention. The slave types can be categorized by the feedback lines they use for responding to the master.

For example, Table 3 illustrates how different slave types can be categorized into three groups. The headings fnctSelected and fnctBufOk can be signals, such as those defined in Table 2.

TABLE 3

Types of Bus Slaves

| Type | fnctSelected | fnctBufOk | Comments |
|---|---|---|---|
| 0 | not present | not present | A minimum slave. Implies that the master is aware of its presence. It can mainly be used for bus resources implemented inside the master. |
| 1 | present | not present | Always ready to accept transfers. |
| 2 | present | present | It can use the fnctBufOk line to give early warning to the master about its capabilities for successful cycles. |

Rules of Behavior for Bus Slaves

In some embodiments, the slaves (or functions) can implement the following rules. A function can asynchronously decode the rbAddress and drive its (or the common) fnctSelected high if that function has a resource at that address.

Functions with fnctBufOk line can drive their fnctBufOk line according to their capabilities. They can also not accept transfers. This, in most cases, means no data available. If, however, the function receives a rbDS while its fnctBufOk is low, the function should not respond.

For function without the fnctBufOk line, the function can wait for the rbDS and respond with data if data is available.

Block Commands

Generally, the master can use transfers to execute commands initiated by the another host such as an operating system, an application, a user, and the like. A write transfer cycle can be used by the host/master to deposit values into registers and to execute commands. For example, many commands can be executed with a single sequence of bus cycles grouped into one or more transfers. These commands can include loading of data into a UART register data bank, setting of a control register which specifies some details of how to execute the serial transfer, and the command to go.

Since resources such as data registers, control registers, commands, and the like are located at different addresses, the master can change the rbAddress for each cycle. It would, however, be convenient to locate resources that are likely modified together at sequential addresses to give the master a simple mechanism, such as an address increment by 1, to load more registers per transfer.

Accordingly, a block commands can be implemented with a sequence of bus cycles (one or more consecutive transfers) characterized by incrementing the rbAddress for each cycle.

Block Command Instruction Set

The multiple address capability of multi-address resources permits for addressing resources in all the block commands where the resource is located. Accordingly, a command instruction set which is hardware independent can be utilized. This is because it is not necessary for the host to know the specific resource addresses. The hardware implementation can activate the resources for at least as many addresses as commands using that resource. The first address of the block command can conveniently identify the command.

For example, a command "updateWhiteBalanceregisters" can use addresses 15–33 and another command "updateAnalogLevel" can use addresses 64–83. If the register controlling the gain of the green channel is needed in both commands, this register can be configured to respond to two addresses chosen for the two command ranges. In such an implementation, commands can have addresses and be identified by a command start address.

As will be understood by those with ordinary skill in the art, the present invention may be embodied in other specific forms without departing from the spirit or essential characteristics thereof. The techniques of the present invention can be implemented in a computer system and/or on an application specific integrated circuit (ASIC). For example, the video pipeline 400 and the computer interface system 500 can be implemented on a peripheral component interconnect (PCI) card. The PCI card can be installed onto the PCI bus of a personal computer. Also, other bus technologies such as NUBUS, ISA, EISA, and Accelerated Graphics Port (AGP) can also be utilized. Furthermore, the techniques of the present invention can be implemented by utilizing the available routines and features such as caching, new instruction sets, and single instruction multiple data (SIMED) tools which are provided by Intel® Corporation's MMX™ technology, Advance Micro Device,® Inc.'s 3DNow!™ technology, and their equivalents. Accordingly, for an understanding of the scope of the invention, reference should be made to the appended claims.

What is claimed is:

1. A bus system comprising:
   an external shared bus;
   an external bus interface coupled to the external shared bus;
   a resource bus coupled to the external bus interface, the external bus interface configured to move data between the external shared bus and the resource bus;
   a video pipeline coupled to the resource bus, the video pipeline including a plurality of components for processing video data, selected ones of the plurality of video processing components coupled to the resource bus;
   wherein the external bus interface is configured as master of the resource bus.

2. A bus system comprising:
   an external shared bus;
   an external bus interface coupled to the external shared bus;
   a resource bus coupled to the external bus interface, the external bus interface configured to move data between the external shared bus and the resource bus;
   a video pipeline coupled to the resource bus, the video pipeline including a plurality of components for processing video data, selected ones of the plurality of video processing components coupled to the resource bus;
   wherein the video pipeline is configured as slave of the resource bus.

3. A bus system comprising:
   an external shared bus;
   an external bus interface coupled to the external shared bus;
   a resource bus coupled to the external bus interface, the external bus interface configured to move data between the external shared bus and the resource bus;
   a video pipeline coupled to the resource bus, the video pipeline including a plurality of components for processing video data, selected ones of the plurality of video processing components coupled to the resource bus;
   wherein the video pipeline includes a sensor for capturing the video data.

4. The bus system of claim 3 wherein the sensor is selected from a group consisting of CCD and CMOS sensors.

5. The bus system of claim 3 further including a sensor interface, the sensor interface configured to format the captured video data for the video pipeline.

6. A bus system comprising:
   an external shared bus;
   an external bus interface coupled to the external shared bus;
   a resource bus coupled to the external bus interface, the external bus interface configured to move data between the external shared bus and the resource bus;
   a video pipeline coupled to the resource bus, the video pipeline including a plurality of components for processing video data, selected ones of the plurality of video processing components coupled to the resource bus;
   a UART, the UART configured to provide a communication channel to devices including the plurality of video pipeline components.

7. A bus system comprising:
   an external shared bus;
   an external bus interface coupled to the external shared bus;
   a resource bus coupled to the external bus interface, the external bus interface configured to move data between the external shared bus and the resource bus;
   a video pipeline coupled to the resource bus, the video pipeline including a plurality of components for processing video data, selected ones of the plurality of video processing components coupled to the resource bus;
   a synchronization module, the synchronization module determining when to allow for modifications to the plurality of video pipeline components.

8. A bus system comprising:
an external shared bus;
an external bus interface coupled to the external shared bus;
a resource bus coupled to the external bus interface, the external bus interface configured to move data between the external shared bus and the resource bus;
a video pipeline coupled to the resource bus, the video pipeline including a plurality of components for processing video data, selected ones of the plurality of video processing components coupled to the resource bus;
a data collection module coupled to the resource bus, the data collection module configured to collect information from devices coupled to the resource bus.

9. The bus system of claim 8 wherein the data collection module includes a plurality of modules.

10. A bus system comprising:
an external shared bus;
an external bus interface coupled to the external shared bus;
a resource bus coupled to the external bus interface, the external bus interface configured to move data between the external shared bus and the resource bus;
a video pipeline coupled to the resource bus, the video pipeline including a plurality of components for processing video data, selected ones of the plurality of video processing components coupled to the resource bus;
wherein the video pipeline components include an image sensor, a color separation module, and a compression module.

11. A bus system comprising:
an external shared bus;
an external bus interface coupled to the external shared bus;
a resource bus coupled to the external bus interface, the external bus interface configured to move data between the external shared bus and the resource bus;
a video pipeline coupled to the resource bus, the video pipeline including a plurality of components for processing video data, selected ones of the plurality of video processing components coupled to the resource bus;
an audio pipeline, the audio pipeline including a plurality of components for processing audio data, selected ones of the plurality of audio processing components coupled to the resource bus.

12. The bus system of claim 11 wherein the plurality of audio pipeline components include a microphone sensor interface, a volume adjustment, an audio sampler.

13. A bus system comprising:
an external shared bus;
an external bus interface coupled to the external shared bus;
a resource bus coupled to the external bus interface, the external bus interface configured to move data between the external shared bus and the resource bus;
a video pipeline coupled to the resource bus, the video pipeline including a plurality of components for processing video data, selected ones of the plurality of video processing components coupled to the resource bus;
wherein the external shared bus is selected from a group consisting of USB, EPP, ECP, Firewire, NUBUS, ISA, EISA, and AGP.

14. A computer program product comprising:
a computer usable medium having computer readable code embodied therein for causing the processing of data, the computer code comprising instructions for:
collecting information from a component within a data processing pipeline;
processing the collected information to determine whether to make an adjustment to the data processing component; and
if it is determined that an adjustment is to be made to the data processing component, determining a triggering event and waiting for the triggering event before making the adjustment.

15. A method of providing automatic adjustments to a data processing pipeline to avoid introduction of artifacts into data being processed by the data processing pipeline, the method comprising:
collecting information from a component within the data processing pipeline;
processing the collected information to determine whether to make an adjustment to the data processing pipeline; and
if it is determined that an adjustment is to be made to the data processing pipeline, determining a triggering event and waiting for the determined triggering event before making the adjustment.

16. The method of claim 15 wherein the data processing pipeline processes video data.

17. The method of claim 16 wherein the determined triggering event is 1–3 frames of video data.

18. The method of claim 15 further comprising collecting information from a plurality of additional components within the data processing pipeline.

19. A method for synchronizing operations in a bus system comprising the steps of:
receiving data;
loading the received data into a shadow storage;
determining whether to update an active storage with the loaded data from the shadow storage;
if it is determined that the active storage is not to be updated with the loaded data from the shadow storage, waiting for a next determining step; and
once it is determined that the active storage is to be updated with loaded data from the shadow storage, transferring the loaded data from the shadow storage into the active storage,
wherein the waiting step avoids introduction of artifacts into data being processed.

20. The method of claim 19 further including translating received data.

21. The method of claim 19 wherein the determining act is resolved in accordance with information collected from components within the bus system.

22. The method of claim 19 wherein the determining act is resolved by an outside source.

23. The method of claim 22 wherein the outside source is selected from a group comprising user instructions, stored settings, determinations by an application, and a source on the internet.

24. The method of claim 19 wherein the shadow storage is selected from a group consisting of DRAM, EDO DRAM, SDRAM, VRAM, SRAM, and flash memory.

25. The method of claim 19 wherein the active storage is selected from a group consisting of DRAM, EDO DRAM, SDRAM, VRAM, SRAM, and flash memory.

* * * * *